(12) United States Patent
Park et al.

(10) Patent No.: US 9,244,883 B2
(45) Date of Patent: Jan. 26, 2016

(54) RECONFIGURABLE PROCESSOR AND METHOD OF RECONFIGURING THE SAME

(75) Inventors: Jae-un Park, Seoul (KR); Ki-seok Kwon, Seoul (KR); Sang-suk Lee, Busan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 12/716,027

(22) Filed: Mar. 2, 2010

(65) Prior Publication Data

US 2010/0268862 A1 Oct. 21, 2010

(30) Foreign Application Priority Data

Apr. 20, 2009 (KR) ........................ 10-2009-0034218

(51) Int. Cl.
*G06F 15/78* (2006.01)
*G06F 9/30* (2006.01)
*G06F 9/38* (2006.01)

(52) U.S. Cl.
CPC ........ *G06F 15/7867* (2013.01); *G06F 9/30189* (2013.01); *G06F 9/3897* (2013.01)

(58) Field of Classification Search
CPC ............ G06F 9/30181; G06F 9/30189; G06F 9/3897; G06F 12/08; G06F 15/7867; G06F 15/7871; G06F 15/7878; G06F 15/7882; G06F 2212/205; G06F 13/24; G06F 1/3203; G06F 21/74; G06F 8/65; G06F 9/4812; G06F 11/302; G06F 11/3093; G06F 13/385; G06F 1/3225; G06F 9/4401; G06F 9/4403; G06F 9/466; G06F 15/7875; G06F 9/461; G06F 9/462
USPC ............. 711/101, 118, E12.002, 103; 714/15
See application file for complete search history.

(56) References Cited

U.S. PATENT DOCUMENTS 7,478,227 B2 *  1/2009  Ryu et al. ...................... 712/241
7,836,277 B2 * 11/2010  Park et al. ..................... 712/207

(Continued)

FOREIGN PATENT DOCUMENTS

JP     2006-164186      6/2006
KR   10-1998-0010789 A   4/1998

(Continued)

OTHER PUBLICATIONS

Korean Office Action issued on Apr. 15, 2015 in counterpart Korean Application No. 10-2009-0034218 (9 pages, in Korean, with English translation).

*Primary Examiner* — Zhuo Li (74) *Attorney, Agent, or Firm* — NSIP Law (57) ABSTRACT

A technology for controlling a reconfigurable processor is provided. The reconfigurable processor dynamically loads configuration data from a peripheral memory to a configuration memory while a program is being executed, in place of loading all compiled configuration data in advance into the configuration memory when booting commences. Accordingly, a reduction in capacity of a configuration memory may be achieved.

14 Claims, 4 Drawing Sheets

(56) References Cited

U.S. PATENT DOCUMENTS

| | | | |
|---|---|---|---|
| 7,856,231 B2 * | 12/2010 | Oh | 455/425 |
| 7,870,364 B2 * | 1/2011 | Bang et al. | 712/15 |
| 8,261,042 B2 * | 9/2012 | Kanstein et al. | 712/15 |
| 2006/0225139 A1 * | 10/2006 | Takada et al. | 726/27 |
| 2007/0168718 A1 * | 7/2007 | Reblewski et al. | 714/15 |
| 2007/0186085 A1 * | 8/2007 | Yim et al. | 712/244 |
| 2007/0288930 A1 * | 12/2007 | Yim et al. | 718/107 |
| 2008/0104601 A1 * | 5/2008 | Kaneko et al. | 718/103 |
| 2009/0055626 A1 * | 2/2009 | Cho et al. | 712/29 |
| 2009/0070552 A1 * | 3/2009 | Kanstein et al. | 712/29 |
| 2010/0235554 A1 * | 9/2010 | Chang et al. | 710/104 |

FOREIGN PATENT DOCUMENTS

| | | |
|---|---|---|
| KR | 10-2001-0020545 | 3/2001 |
| KR | 10-2001-0042690 A | 5/2001 |
| KR | 10-2004-0017291 A | 2/2004 |
| KR | 10-2007-0059238 | 6/2007 |
| WO | WO 99/00739 | 1/1999 |

\* cited by examiner

| ID | SDRAM_OFFSET | SIZE | VALID | CM_ADDR | NEXT_LOOP |
|---|---|---|---|---|---|
| Loop1 | | | | | |
| Loop2 | | | | | |

SDRAM_BASE  RECENT_LOOP

FIG.5

RECONFIGURABLE PROCESSOR AND METHOD OF RECONFIGURING THE SAME

CROSS-REFERENCE TO RELATED APPLICATION

This application claims the benefit under 35 U.S.C. §119(a) of Korean Patent Application No. 10-2009-0034218, filed Apr. 20, 2009 in the Korean Intellectual Property Office, the entire disclosure of which is incorporated herein by reference for all purposes.

BACKGROUND

1. Field

The following description relates to a processor with reconfigurable architecture, and additionally, to a method of managing configuration data of a configuration memory.

2. Description of the Related Art

Reconfigurable computing is based on the arrangement of a processor with reconfigurable hardware devices that are in an array. The behavior of such reconfigurable hardware devices, including data flow between the reconfigurable hardware devices, is tailored to perform a specific task. A reconfigurable processor may have processing performance which ranks up with dedicated hardware.

A piece of reconfigurable hardware may be referred to as a processing element (PE). The size of a PE is referred to as its granularity. A PE whose granularity is relatively large has a Coarse-Grained Reconfigurable Architecture (CGRA), whereas a PE whose granularity is relatively small has a Fine-Grained Reconfigurable Architecture (FGRA).

A Very Long Instruction Word (VLIW) machine is a CPU structure designed to use Instruction Level Parallelism (ILP). In the VLIW architecture, a processor includes multiple processing blocks. Multiple instructions that configure different steps of instructions to be sequentially executed are processed in parallel by the multiple processing blocks. Such a parallel processing architecture typically includes relatively complicated hardware to control an execution schedule of instructions.

In the VLIW architecture, an execution schedule of instructions is determined external to the processor, by a compiler which is implemented as software, and an internal execution schedule of the processor is fixed. This configuration simplifies hardware for relatively complicated control.

A reconfigurable processor includes a plurality of functional units and a configuration memory in which configuration data which determines a configuration of the functional units is stored. A configuration of the functional units may be determined by using a method in which a main processor including the functional units accesses the configuration memory to acquire configuration data and controls, for example, multiplexers to determine paths between the functional units based on the configuration data. An optimal configuration is contingent upon content of a program to be executed, and a complier determines an optimal processor configuration while compiling the program and creates configuration data based on the optimal processor configuration.

A Coarse Grained Architecture (CGA) is suitable for loop processing. Accordingly, an optimal processor configuration may be determined for each loop according to content of the loop, yielding loop-specific configuration data. If a program includes a large number of loops, a relatively large amount of configuration data is needed, which leads to the configuration memory requiring a corresponding larger capacity.

SUMMARY

In one general aspect, a reconfigurable processor includes a plurality of functional units, a configuration memory, and a configuration memory manager, wherein the configuration memory manager dynamically reads configuration data for the plurality of functional units and stores the read configuration data in the configuration memory while a program is being executed.

The reconfigurable processor may further include a peripheral memory to store the configuration data, wherein the configuration memory manager reads the configuration data from the peripheral memory. The configuration data may be generated while compiling.

In another general aspect, a reconfigurable processor which operates a first operating mode and a second operating mode includes a plurality of functional units, a controller to control operating modes of the functional units, a configuration memory to store configuration data, and a configuration memory manager to dynamically read, in the second operating mode, configuration data for the functional units and store the read configuration data in the configuration memory while a program is being executed, wherein the configuration data determines a configuration of the functional units in the second operating mode.

The reconfigurable processor may further include a peripheral memory to store the configuration data for the functional units, wherein the configuration memory manager reads the configuration data from the peripheral memory. The configuration data may be generated while compiling.

The first mode may be a Very Long Instruction Word (VLIW) mode and the second mode may be a Coarse Grained Array (CGA) mode, and the controller may change its operating mode from the VLIW mode to the CGA mode when the controller encounters a loop instruction.

The configuration memory manager may reads, in advance, configuration data associated with a loop that is about to be executed, with reference to a loop information table, and store the read configuration data in the configuration memory.

The loop information table may include at least one "valid" flag for indicating whether or not the configuration data associated with respective loops is stored currently in the configuration memory, wherein the configuration memory manager determines, based on the at least one "valid" flag, whether the configuration data exists in the configuration memory, and wherein the configuration memory manager reads the configuration data from the peripheral memory when the configuration data does not exist in the configuration memory.

In another general aspect, a reconfiguration method of a reconfigurable processor includes searching for configuration data in a configuration memory, reading the configuration data from a peripheral memory when the configuration data does not exist in the configuration memory, and storing the read configuration data in the configuration memory, and accessing the configuration memory to read the configuration data and reconfiguring a plurality of functional units based on the configuration data.

The configuration data searched for in the configuration memory may be configuration data associated with an instruction to be executed in a future operation.

The configuration data may be stored in association with at least one "valid" flag for indicating whether the configuration data is stored in the configuration memory, and the searching for the configuration data in the configuration memory may include checking a corresponding "valid" flag.

The reconfiguration method may further include loading the configuration data into the peripheral memory during a booting sequence.

In another general aspect, a reconfiguration method of a reconfigurable processor includes checking at least one "valid" flag for indicating whether configuration data associated with a loop about to be executed is stored in a configuration memory, by searching for a loop identifier (ID) associated with the loop in a loop information table, in response to the configuration data associated with the loop not being stored in the configuration memory, reading the configuration data from a peripheral memory, storing the read configuration data in the configuration memory and updating a "valid" flag corresponding to the configuration data, and reading the configuration data associated with the loop from the configuration memory and reconfiguring a plurality of functional units based on the configuration data.

The operations may be performed in response to an operating mode being changed from a Very Long Instruction Word (VLIW) mode to a Coarse Grained Array (CGA) mode.

The reconfiguration method may further include generating the configuration data when compiling, and loading the configuration data into the peripheral memory during a booting sequence.

Other objects, features and advantages will be apparent from the following description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses, and/or methods described herein will likely suggest themselves to those of ordinary skill in the art. Also, descriptions of well-known functions and constructions may be omitted to increase clarity and conciseness.

Figure 1:
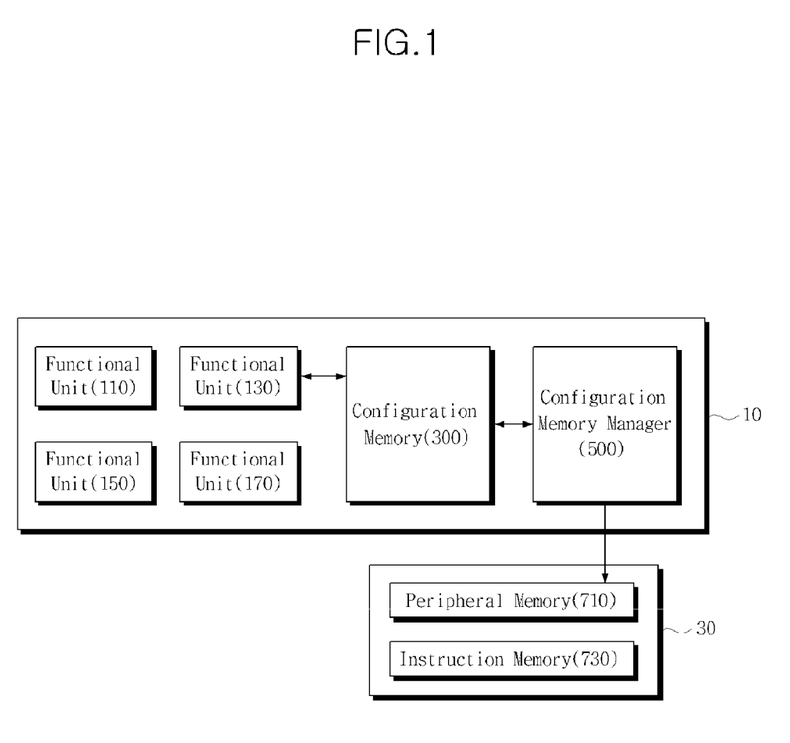
FIG. 1 is a block diagram schematically illustrating an example of a configuration of a reconfigurable processor.

FIG. 1 illustrates an example of a configuration of a reconfigurable processor. According to one example, the reconfigurable processor dynamically reads configuration data for a plurality of functional units and transfers the configuration data to a configuration memory when a program is executed. As FIG. 1 illustrates, the reconfigurable processor includes a plurality of functional units 110, 130, 150 and 170, a peripheral memory 710 in which configuration data is stored, a configuration memory 300 and a configuration memory manager 500. The configuration memory manager 500 reads a part of the configuration data stored in the peripheral memory 710 and transfers the read part to the configuration memory 300 when a program is executed. It is noted that four functional units are illustrated in this example; however, the number of functional units is not necessarily limited to this particular quantity.

The plurality of functional units 110, 130, 150 and 170 each includes an arithmetic logic unit (ALU), multipliers or load/store units, a local register file in a coarse grained array (CGA)-based architecture, and a plurality of input/output units. According to one example, a plurality of input/output paths exist between the functional units 110, 130, 150 and 170; multiplexers are used to establish these paths between the functional units 110, 130, 150 and 170. The outputs of the multiplexers are selected according to configuration data, and accordingly a configuration of the processor is contingent upon the configuration data.

A processor core 10, including the functional units 110, 130, 150 and 170, functions as a controller for controlling the configuration of the processor. The processor core 10 controls operating modes by reconfiguring the functional units 110, 130, 150 and 170, according to configuration data stored in the configuration memory 300. For example, when a reconfiguration instruction is executed while a program is being executed, the processor core 10 may change settings of the functional units 110, 130, 150 and 170. However, the processing may alternatively be performed by separate hardware which functions as a controller, instead of by the processor core 10.

The configuration memory 300 may be a high-speed memory in order to reduce delays occurring upon reconfiguration. Configuration data generated after compiling is loaded into the peripheral memory 710. In a Very Long Instruction Word (VLIW) mode, execution programs are loaded into an instruction memory 730. Functional units (for example, 110 and 130) that operate in the VLIW mode fetch instructions from the instruction memory 730 and then execute the instructions. As an example, the peripheral memory 710 and instruction memory 730 may be implemented as one synchronous dynamic random access memory (SDRAM) 30. However, the peripheral memory 710 and instruction memory 730 may also be implemented as separate memories or external elements.

Also, a compiler adapted for use in a given architecture may be provided. If a program requiring high-speed processing is complied through the complier, configuration data and execution files specific to the program and to the architecture are generated. The configuration data is loaded into the peripheral memory 710.

The processor core 10, when reconfiguration is implemented during the execution of the program, accesses the configuration memory 300, reads configuration data from the configuration memory 300, and reconfigures the functional units 110, 130, 150 and 170 based on the configuration data. If the configuration data does not exist in the configuration memory 300, the configuration memory manager 500 loads the corresponding configuration data. Accordingly, the configuration memory manager 500 accesses the peripheral memory 710, reads the corresponding configuration data from the peripheral memory 710 and writes the read configuration data at a predetermined region of the configuration memory 300. The process core 10 accesses the configuration memory 300, reads the configuration data from the configuration memory 300 and reconfigures the functional units 110, 130, 150 and 170, such that the functional units 110, 130, 150 and 170 are reconfigured to be suitable for the specific program codes. The functional units 110, 130, 150 and 170 may then respectively receive and process instructions that are to be executed in parallel.

Figure 2:
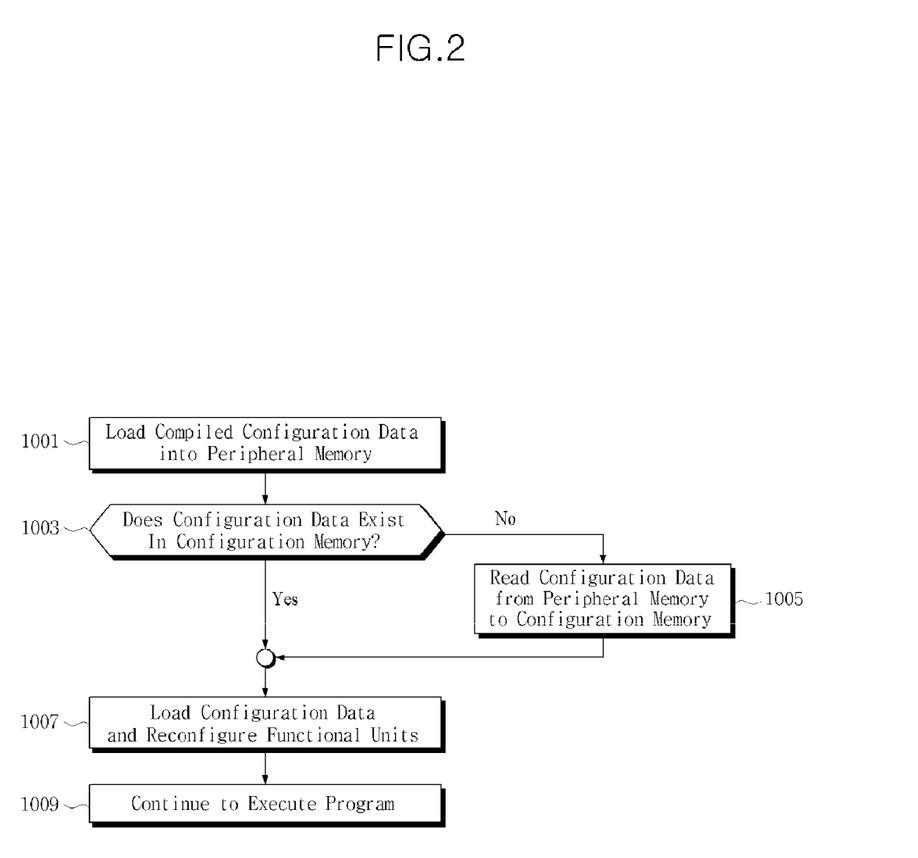
FIG. 2 is a flowchart schematically illustrating an example of a reconfiguration method of the reconfigurable processor.

FIG. 2 illustrates an example of a reconfiguration method of the reconfigurable processor. Referring to FIGS. 1 and 2, the reconfiguration method includes searching for configuration data in the configuration memory 300 (1003). The reconfiguration method further includes reading the corresponding configuration data from the peripheral memory 710 when the corresponding configuration data does not exist in the configuration memory 300 and storing the read configuration data in the configuration memory 300 (1005). The reconfiguration method additionally includes accessing the configuration memory 300 and reconfiguring the functional units 110, 130 150 and 170 (1007) based on the configuration data.

The reconfiguration method illustrated in FIG. 2 may be applied to the reconfigurable processor illustrated in FIG. 1, but is not limited thereto. In the following example, wherein the method illustrated in FIG. 2 is applied to the reconfigurable processor illustrated in FIG. 1, the processor core 10 of the reconfigurable processor reads configuration data from the configuration memory 300 and reconfigures the functional units 110, 130, 150 and 170 for executing the corresponding instructions, while the processor core 10 processes programs. The configuration data is divided into blocks, and each block is assigned an identifier.

The configuration memory manager 500 includes a table for configuration data management. The table includes identifiers of configuration data blocks, and "valid" flags for indicating whether or not corresponding configuration data blocks are currently loaded in the configuration memory 300. The processor core 10 checks the valid flags to determine whether the corresponding configuration data blocks exist in the configuration memory 300. According to another example, the processor core 10 may directly search for identifiers in the configuration memory 300.

In compiling the program, the compiler divides execution files into a plurality of blocks, each of which includes instructions that can be executed optimally when the functional units are arranged to have the same processor configuration. At the same time, configuration data corresponding to each of blocks for configuring an optimal processor architecture is generated and the whole configuration data is loaded into the peripheral memory 710. When a block to be executed is changed while executing a program, the processor core 10 loads configuration data corresponding to the new block from the configuration memory 300, with reference to the table. If the corresponding configuration data does not exist in the configuration memory, the processor core 10 reads the corresponding block, or accordingly two or more successive configuration data blocks, together with the corresponding block from the peripheral memory 710, and transfers the read block(s) to the configuration memory 300.

According to an additional embodiment, when searching for configuration data in the configuration memory 300, configuration data associated with instructions that are about to be executed may be searched for in advance. That is, before execution of a current block is completed by the functional units 110, 130, 150 and 170, instructions that are about to be executed are predicted, and configuration data corresponding to one or more blocks that are about to be executed, based on the predicted instructions, is loaded in advance into the configuration memory 300. Accordingly, while the configuration data is loaded from the peripheral memory 710 to the configuration memory 300, the process core 10 may continue to operate, without interruption.

Figure 3:
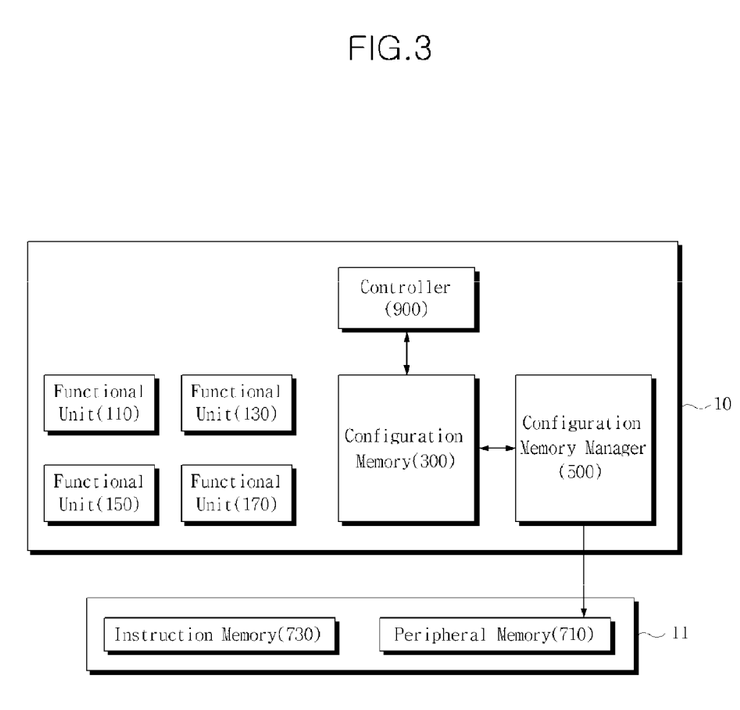
FIG. 3 is a block diagram schematically illustrating another example of a configuration of a reconfigurable processor according.

FIG. 3 illustrates another example of a configuration of a reconfigurable processor. In this embodiment, the processor changes its operation mode from a first operating mode to a second operating mode or vice versa, according to changes of instruction blocks. As FIG. 3 illustrates, the reconfigurable processor includes a plurality of functional units 110, 130, 150 and 170, a controller 900 which controls operating modes of the plurality of functional units 110, 130, 150 and 170, a configuration memory 300, and a configuration memory manager 500. The configuration memory 300 stores configuration data determining a configuration of the functional units 110, 130, 150 and 170 in the second operating mode. The configuration memory manager 500 dynamically reads, in the second operating mode, configuration data for the functional units 110, 130, 150 and 170 and stores the read configuration data from the peripheral memory 710 in the configuration memory 300 while a program is being executed. As noted previously, four functional units are illustrated in this example; however, the number of functional units is not necessarily limited to this particular quantity.

Accordingly, the capacity of the configuration memory 300 may be reduced. The reduction in capacity of the configuration memory 300 is may help improve performance, as the configuration memory 300 is accessed frequently, has a large word size, and operates at high speed. Further, the processor may be connected to an external memory 710 in which configuration data is stored. The configuration data generated by compiling according to a booting sequence is loaded into the peripheral memory 710. Paths between functional units may be established by multiplexers.

The configuration data is classified according to loops and identified by loop identifiers (IDs). The configuration memory 300 stores the configuration data for each loop such that each piece of configuration data is stored in association with its loop ID. The functional units (for example, 110 and 130) execute a CGA instruction when a loop instruction is initiated while executing instructions. Accordingly, the controller 900 accesses the configuration memory 300 to read configuration data from the configuration memory 300, and reconfigures all functional units 110, 130, 150 and 170 according to the configuration data. The controller 900 searches for a loop ID of a loop that is about to be executed in the configuration memory 300, and reads configuration data corresponding to the found loop ID.

If the controller 900 fails to find the configuration data in the configuration memory 300, that is, if the controller 900 fails to find the required loop ID, the controller 900 instructs the configuration memory manager 500 to load the configuration data corresponding to the loop into the configuration memory 300. The configuration memory manager 500 manages individual configuration data in units of loops. Accordingly, such a request from the controller 900 includes a loop ID.

The configuration memory manager 500 reads the configuration data, including the loop ID, from among configuration data loaded in the peripheral memory 710 upon booting, and stores the read configuration data in the configuration memory 300. The configuration memory manager 500 manages the configuration data through loop IDs and valid flags that indicate whether or not configuration data associated with the respective loops is stored in the configuration memory 300.

Further, the configuration memory manager 500 may manage the configuration data through a loop information table.

Figure 4:
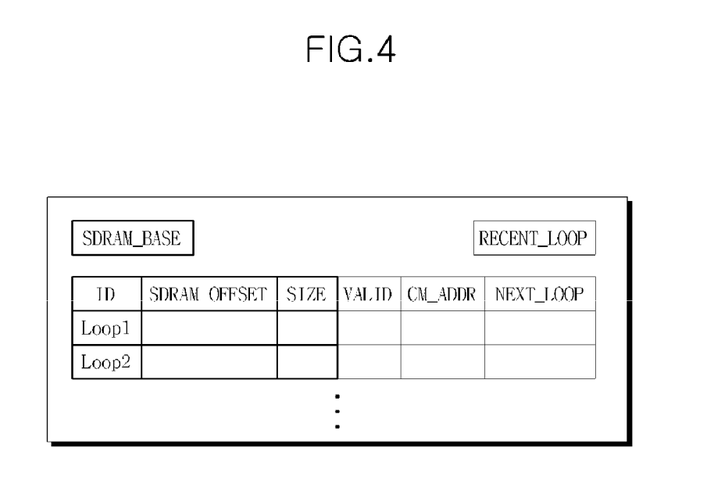
FIG. 4 illustrates an example of a loop information table.

FIG. 4 illustrates an example of a loop information table. The left part of the loop information table is for managing configuration data stored in the peripheral memory 710, and is populated statically during the booting process. Here, 'SDRAM_BASE' indicates a base address for the memory location storing the corresponding configuration data. 'ID' represents loop IDs to identify configuration data. 'SDRAM_OFFSET' indicates offset values from the SDRAM_BASE to a memory location where configuration data having the loop ID is stored. 'SIZE' indicates sizes of corresponding configuration data. For example, in order to read configuration data for Loop1, a memory area having the size of SIZE from a location with an address value corresponding to 'SRAM_BASE+SDRAM_OFFSET' is read from the SDRAM.

The right side of the loop information table is for dynamically managing configuration data stored in the configuration memory 300. A 'VALID' field stores values indicating whether or not configuration data with corresponding IDs has been loaded into the configuration memory 300, wherein a value stored in a 'VALID' field corresponding to a certain ID is '1' if configuration data with the ID has been loaded into the configuration memory 300, and otherwise, the value stored in the 'VALID' field is '0'. Upon initialization, values stored in the 'Valid' field are all set to '0'. The configuration memory manager 500, when determining, based on the 'VALID' field, that configuration data does not exist in the configuration memory 300, reads the configuration data from the peripheral memory 710 and stores the read configuration data in the configuration memory 300.

'CM_ADDR' stores addresses of configuration data stored in the configuration memory 300. 'RECENT_LOOP' stores IDs of loops that are being currently executed. 'NEXT_LOOP' stores IDs of loops that are about to be executed. Since the loops are identified by their loop IDs, the loop IDs may be used as indices of the configuration memory 300 and the configuration memory manager 500 may read start addresses of the loops using the loop IDs. Accordingly, an instruction for accessing the configuration memory 300 may include a loop ID instead of a specific address.

According to another example, the configuration memory manager 500 reads configuration data associated with a loop that is about to be executed, in advance, with reference to a loop information table which stores the data of configuration data associated with loops in a program to be executed. The configuration memory manager 500 stores the read configuration data in the configuration memory 300. Accordingly, it is possible to minimize the interruption of a program execution which may occur while configuration data is being loaded into the configuration memory 300.

Hereinafter, the operation of the reconfigurable processor illustrated in FIG. 3 will be described. After a program is compiled, configuration data is loaded into the peripheral memory 710, and execution files in a VLIW mode are loaded into the instruction memory 730. Upon initialization, the reconfigurable processor operates in the VLIW mode. When the reconfigurable processor executes a loop in the VLIW mode, the controller transfers a loop ID of the loop to the configuration memory manager 500. In order to execute the loop, all or some of the functional units 110, 130, 150 and 170 may operate in a CGA mode. Four functional units (110, 130, 150 and 170) are illustrated; however, the number of functional units may be 8, 16 or 32.

The configuration memory manager 500 checks a "valid" flag for indicating whether configuration data associated with a loop that is about to be executed is stored in the configuration memory 300, by searching for a loop ID of the loop in a loop information table. If the corresponding configuration data is not stored in the configuration memory 300, the configuration memory manager 500 reads the configuration data from the peripheral memory 710 and updates the related valid flags.

That is, the configuration memory manager 500 checks a 'VALID" flag for a loop that is about to be executed, and if the 'VALID' flag is '0', stalls the operation of the processor core 10 and copies, to the configuration memory 300, configuration data which occupies a space corresponding to a SIZE value of the loop from a location with an address value corresponding to 'SRAM_BASE+SDRAM_OFFSET' of a SDRAM 11. A method of storing configuration data in the configuration memory 300 may include Least Recently Used (LRU), First-In-First-Out (FIFO), or similar methods. When the copying is complete, the configuration memory manager 500 sets a VALID value of the loop to '1' and updates a CM_ADDR value of the loop in the loop information table. Thereafter, the configuration memory manager 500 transfers the CM_ADDR value to the controller 900.

The controller 900 reads the configuration data associated with the corresponding loop from the configuration memory 300, reconfigures the functional units 110, 130, 150 and 170 based on the configuration data and resumes execution of a program.

The configuration memory manager 500 checks the 'VALID' flag of the corresponding loop, and, if the 'VALID' flag is '1', transfers the CM_ADDR value of the loop to the controller 900.

Accordingly, when the CGA mode changes to the VLIW mode after the loop instruction is executed in the CGA mode, the configuration memory manager 500 copies configuration data corresponding to a next loop (NEXT_LOOP) to be executed, following the current loop (RECENT_LOOP), from the peripheral memory 710 of the SDRAM 11 to the configuration memory 300. While the configuration data of the next loop is copied from the peripheral memory 710 to the configuration memory 300, the functional units 110 and 130 operate in the VLIW mode. After the copying is complete, the VALID and CM_ADDR values of the corresponding loop are updated. If the VLIW mode has to change again to the CGA mode before the processing is complete, the operations of the functional units 110 and 130 are stalled until the processing is complete.

The operation of the reconfigurable processor is described below, using as an example the case where the following program is executed.

```
Function_A {
    Loop1 {
        A; // local loop A
        B; // local loop B
        C; // local loop C
    };
    Loop2 {
        D; // local loop D
        E; // local loop E
    };
```

Figure 5:
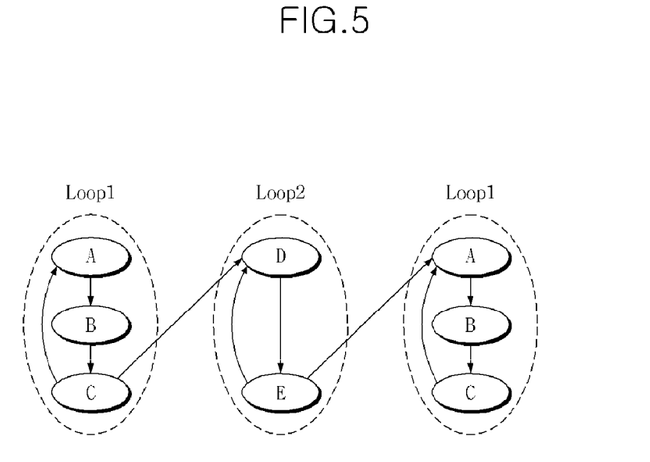
FIG. 5 illustrates execution of an example of a loop program.

In this example, it is assumed that function_A performs processing according to the flow illustrated in FIG. 5. Here, the function_A, upon initialization, has static loop information as shown in the table below. In the following loop information table, 'SIZE' is represented in units of words, and one configuration is designated by 28 words.

| ID | SDRAM_OFFSET | SIZE | VALID | CM_ADDR | NEXT_LOOP |
|---|---|---|---|---|---|
| A | x00000 | 56 | 0 | | |
| B | x000E0 | 56 | 0 | | |
| C | x001C0 | 56 | 0 | | |
| D | x00214 | 84 | 0 | | |
| E | x002F4 | 56 | 0 | | |

While processing of the flow of Loop 1 is being performed as shown in FIG. 5, the loop information table has the following values.

| ID | SDRAM_OFFSET | SIZE | VALID | CM_ADDR | NEXT_LOOP |
|---|---|---|---|---|---|
| A | x00000 | 56 | 1 | 0x0000 | B |
| B | x000E0 | 56 | 1 | 0x0002 | C |
| C | x001C0 | 56 | 1 | 0x0004 | A |
| D | x00214 | 84 | 0 | | |
| E | x002F4 | 56 | 0 | | |

When Loop 2 is processed after the processing of Loop 1 has been completed, the loop information table has values as follows.

| ID | SDRAM_OFFSET | SIZE | VALID | CM_ADDR | NEXT_LOOP |
|---|---|---|---|---|---|
| A | x00000 | 56 | 0 | 0x0000 | B |
| B | x000E0 | 56 | 0 | 0x0002 | C |
| C | x001C0 | 56 | 0 | 0x0004 | D |
| D | x00214 | 84 | 1 | 0x0000 | E |
| E | x002F4 | 56 | 1 | 0x0003 | D |

That is, when processing of Loop 2 is being performed after the processing on the Loop 1 has been completed, configuration data has to be loaded into a configuration memory, but since no memory space remains in the configuration memory, configuration data existing in the configuration memory is deleted and configuration data to process Loops D and E is loaded into the memory space from which the existing configuration data has been deleted.

Then, when processing is performed in an order of E→A→B→C→A, the loop information table has the following values.

| ID | SDRAM_OFFSET | SIZE | VALID | CM_ADDR | NEXT_LOOP |
|---|---|---|---|---|---|
| A | x00000 | 56 | 1 | 0x0000 | B |
| B | x000E0 | 56 | 1 | 0x0002 | C |
| C | x001C0 | 56 | 1 | 0x0004 | A |
| D | x00214 | 84 | 0 | 0x0000 | E |
| E | x002F4 | 56 | 0 | 0x0003 | A |

That is, after the processing of the Loop E has been completed, configuration data to process Loops A, B and C is loaded into the configuration memory. Since NEXT_LOOP information is written in the loop information table in this way, configuration data is recognized in advance according to CGA settings and accordingly, a stall period of the processor to acquire the configuration data may be reduced by loading the configuration data in advance into the configuration memory. That is, the configuration memory manager 500, which is implemented as an independent piece of hardware, loads configuration data to the configuration memory 300 from the peripheral memory 710, when a loop to be executed changes, using NEXT_LOOP information written in advance before the corresponding configuration data is requested by the controller 900.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A reconfigurable processor comprising:
functional units;
a configuration memory configured to store configuration data of the functional units and of a loop to be executed; and
a configuration memory manager configured to
determine whether the configuration data is currently stored in the configuration memory based on a loop information table comprising a loop ID identifying the configuration data and a valid flag indicating whether the configuration data is currently stored in the configuration memory, and
read the configuration data from a peripheral memory according to the loop ID, and store the read configuration data in the configuration memory while a program is being executed, in response to the configuration data being determined to be not currently stored in the configuration memory,
wherein the loop information table comprises information of a next loop to be executed after the loop, and
wherein the configuration memory manager is further configured to:
determine whether next configuration data of the functional units and of the next loop is currently stored in the configuration memory based on the information of the next loop that is included in the loop information table, and based on the loop information table comprising a valid flag indicating whether the next configuration data is currently stored in the configuration memory; and
read the next configuration data from the peripheral memory, store the read next configuration data in the configuration memory while the program is being executed, and update the valid flag indicating whether the next configuration data is currently stored in the configuration memory, in response to the next configuration data being determined to be not currently stored in the configuration memory.

2. The reconfigurable processor of claim 1, wherein the configuration data is generated while compiling.

3. The reconfigurable processor of claim 1, wherein the configuration memory manager is further configured to update the valid flag to indicate that the configuration data is not currently stored in the configuration memory in response to the loop being completed and the loop and the next loop being in different loop groups.

4. The reconfigurable processor of claim 1, wherein the loop information table comprises a size of the configuration data.

5. The reconfigurable processor of claim 1, wherein the configuration memory manager is configured to read the configuration data from the peripheral memory based on the size of the configuration data that is included in the loop information table.

6. The reconfigurable processor of claim 1, wherein the configuration memory manager comprises the loop information table.

7. A reconfigurable processor configured to operate in a first operating mode and a second operating mode, the reconfigurable processor comprising:
functional units;
a controller configured to control operating modes of the functional units;
a configuration memory configured to store configuration data of the functional units in the second operating mode and of a loop to be executed; and
a configuration memory manager configured to
determine whether the configuration data is currently stored in the configuration memory based on a loop information table comprising a loop ID identifying the configuration data and a valid flag indicating whether the configuration data is currently stored in the configuration memory, and
read, in the second operating mode, the configuration data from a peripheral memory according to the loop ID, and store the read configuration data in the configuration memory while a program is being executed, in response to the configuration data being determined to be not currently stored in the configuration memory,
wherein the loop information table comprises information of a next loop to be executed after the loop, and
wherein the configuration memory manager is further configured to:
determine whether next configuration data of the functional units and of the next loop is currently stored in the configuration memory based on the information of the next loop that is included in the loop information table, and based on the loop information table comprising a valid flag indicating whether the next configuration data is currently stored in the configuration memory; and
read the next configuration data from the peripheral memory, store the read next configuration data in the configuration memory while the program is being executed, and update the valid flag indicating whether the next configuration data is currently stored in the configuration memory, in response to the next configuration data being determined to be not currently stored in the configuration memory.

8. The reconfigurable processor of claim 4, wherein the configuration data is generated while compiling.

9. The reconfigurable processor of claim 4, wherein:
the first operating mode is a very long instruction word (VLIW) mode;
the second operating mode is a coarse grained array (CGA) mode; and
the controller is configured to change from the VLIW mode to the CGA mode in response to the controller encountering a loop instruction.

10. A reconfiguration method of a reconfigurable processor, the reconfiguration method comprising:
determining whether configuration data of functional units and of a loop to be executed is currently stored in a configuration memory configured to store the configuration data according to a loop identifier (ID) identifying the configuration data, based on a loop information table comprising the loop ID and a valid flag indicating whether the configuration data is currently stored in the configuration memory;
reading the configuration data from a peripheral memory according to the loop ID, and storing the read configuration data in the configuration memory while a program is being executed, in response to the configuration data being determined to be not currently stored in the configuration memory,
wherein the loop information table comprises information of a next loop to be executed after the loop;
determining whether next configuration data of the functional units and of the next loop is currently stored in the configuration memory based on the information of the next loop that is included in the loop information table, and based on the loop information table comprising a valid flag indicating whether the next configuration data is currently stored in the configuration memory; and
reading the next configuration data from the peripheral memory, storing the read next configuration data in the configuration memory while the program is being executed, and updating the valid flag indicating whether the next configuration data is currently stored in the configuration memory, in response to the next configuration data being determined to be not currently stored in the configuration memory.

11. The reconfiguration method of claim 10, further comprising loading the configuration data into the peripheral memory during a booting sequence.

12. A reconfiguration method of a reconfigurable processor, the reconfiguration method comprising:
determining whether configuration data of functional units and of a loop to be executed is currently stored in a configuration memory configured to store the configuration data according to a loop identifier (ID) identifying the configuration data, based on a loop information table comprising the loop ID and a valid flag indicating whether the configuration data is currently stored in the configuration memory;
reading the configuration data from a peripheral memory according to the loop ID, storing the read configuration data in the configuration memory while a program is being executed, and updating the valid flag to indicate that the configuration data is currently stored in the configuration memory, in response to the configuration data being determined to be not currently stored in the configuration memory,
wherein the loop information table comprises information of a next loop to be executed after the loop;

determining whether next configuration data of the functional units and of the next loop is currently stored in the configuration memory based on the information of the next loop that is included in the loop information table, and based on the loop information table comprising a valid flag indicating whether the next configuration data is currently stored in the configuration memory; and reading the next configuration data from the peripheral memory, storing the read next configuration data in the configuration memory while the program is being executed, and updating the valid flag indicating whether the next configuration data is currently stored in the configuration memory, in response to the next configuration data being determined to be not currently stored in the configuration memory.

13. The reconfiguration method of claim 12, wherein the method is performed in response to an operating mode of the reconfigurable processor being changed from a very long instruction word mode to a coarse grained array mode.

14. The reconfiguration method of claim 12, further comprising:

generating the configuration data when compiling; and loading the configuration data into the peripheral memory during a booting sequence.

* * * * *